A. B. IBBOTSON & F. J. TALBOT.
FORMING THREADS ON SCREW-BOLTS AND NUTS.

No. 191,968. Patented June 12, 1877.

Witnesses:
A. H. Norris
James M. Wright Jr.

A. B. Ibbotson,
F. J. Talbot,
Inventors.
by James L. Norris.
Atty.

UNITED STATES PATENT OFFICE.

ALFRED B. IBBOTSON, OF FLORENCE, ITALY, AND FREDERICK J. TALBOT, OF SHEFFIELD, ENGLAND.

IMPROVEMENT IN FORMING THREADS ON SCREW BOLTS AND NUTS.

Specification forming part of Letters Patent No. 191,968, dated June 12, 1877; application filed May 28, 1877.

*To all whom it may concern:*

Be it known that we, ALFRED BUCKINGHAM IBBOTSON, of Florence, Italy, and FREDERICK JOHN TALBOT, of Sheffield, England, have invented an Improvement in Nut-Locks, which is fully set forth in the following specification, reference being had to the accompanying drawing.

The object of the said invention is the permanent retention of screw-nuts upon their bolts and of screw-bolts in their holes in railway-joints and other work which is exposed to vibration, concussion, or other influences tending to render the said bolts or nuts slack or loose, and thereby cause the unfastening or detachment and probable destruction of the joint or parts of the work or structure intended to be secured by the said bolts and nuts.

The manner in which our said invention is carried into practice is fully explained in the following description by the aid of the accompanying drawing, in which—

Figure 4:
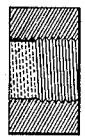
Figure 3:
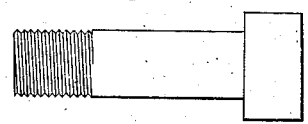
Figure 2:
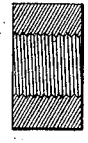
Figure 1:
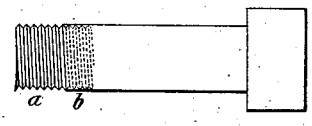

Figure 1 shows a screw-bolt, and Fig. 2 a screw-nut, illustrating the method of forming the threads and fitting the same together according to our invention in the case where the bolt is formed of softer metal than the nut. Figs. 3 and 4 show a bolt and nut, and illustrate the formation of the screw-threads of the same according to our invention in the case when the nut is of softer metal than the bolt.

As our invention is chiefly designed for the securing of railway fish-joints, we will more especially refer to this particular use of our invention in the following description of the same.

When a steel fish-plate is used with tapped or threaded bolt-holes in the same we use bolts or set-screws made of softer metal, by preference of iron, and cut the screw-thread upon the said bolts or screws only a portion of the length that will be required to enter the tapped hole or nut, as shown by the full lines *a*, Fig. 1, so that when such bolts are being screwed into the said steel fish-plate the thread in the latter, being formed of harder metal than the said bolts, will, during the last few turns of the wrench or other implement, act like a screw-plate, and will cut the remainder of the screw-thread on the said bolts or screws on the part where the thread is indicated by the dotted lines *b;* and when the said fish-plates are made of softer metal than steel we may case-harden or otherwise harden the threads in their tapped bolt-holes, to enable them to accomplish the same object—that is to say, to complete the formation of the thread on the partially-screwed bolts or set-screws while the same are being forcibly screwed into the said holes.

We, however, may reverse the above conditions of hardness and softness in the male and female screws—that is to say, when the tapped fish-plates are formed of iron, or other metal softer than steel, the threads of the tapped holes in these plates are only partially cut, and the bolts or screws are formed of steel, and have their threads fully cut upon them; or the said bolts or screws may be of iron, hardened—that is to say, they have their threads case-hardened, or otherwise made harder than the thread of the said bolt-holes, so that when said bolts or screws are screwed into such bolt-holes with the necessary force their hard threads will cut or form the remainder of the thread in the said bolt-holes.

In some instances steel nuts with properly-cut threads, or iron nuts with their threads hardened, may be used for the tightening of the partially-cut bolts or screws; or nuts of softer metal than steel, having their threads partially cut, as shown in Fig. 2, may be used in connection with steel bolts that have their threads properly or fully cut, or with iron bolts or set-screws that have their threads properly or fully cut and hardened, for the purpose of cutting the remainder of the partially-cut threads in the nuts in the act of being forcibly screwed into the same.

This invention, by which a hard and completely-cut thread is made to complete the cutting of the thread of a partially-screwed surface, is not only applicable for use in combination with the above-described joints, but to all other railroad-joints and in other work where bolts or screws are used, and where it is desirable to insure the tightness of such joints for an extremely long period.

We claim as our invention—

1. A bolt or screw with a partially-cut screw-thread thereon, in combination with a plate or nut having a bolt-hole properly or fully tapped with a screw-thread made harder than the uncut or unscrewed portion of the said bolt, so that in screwing the said bolt or screw into the said tapped or threaded hole the formation of the thread on the said bolt or screw will be completed, in the manner set forth, and for the purpose specified.

2. A bolt or screw with the thread fully or properly cut thereon, in combination with a plate or nut having a hole therein, and formed of metal softer than the said bolt or screw, and with the thread only partially cut therein, so that the thread in the said hole or nut is completed by the forcing of the said bolt or screw into the same, in the manner above set forth, and for the purpose specified.

ALFRED B. IBBOTSON.
F. J. TALBOT.

Witnesses:
HENRY I. IBBOTSON,
CHARLES HARVEY.